United States Patent [19]

Bond

[11] 4,347,580

[45] Aug. 31, 1982

[54] ARRAY CONVOLVER/CORRELATOR

[75] Inventor: James W. Bond, San Diego, Calif.

[73] Assignee: The United States of America as represented by the Secretary of the Navy, Washington, D.C.

[21] Appl. No.: 170,492

[22] Filed: Jul. 21, 1980

[51] Int. Cl.³ .................... G06G 7/19; G06F 15/34
[52] U.S. Cl. .................................. 364/824; 364/728
[58] Field of Search .................... 364/824, 819, 728

[56] References Cited

U.S. PATENT DOCUMENTS

| | | | |
|---|---|---|---|
| 3,950,635 | 4/1976 | Constant | 364/728 X |
| 3,980,873 | 9/1976 | Mattei | 364/728 X |
| 4,103,333 | 7/1978 | Poirier et al. | 364/824 |
| 4,156,923 | 5/1979 | Lampe et al. | 364/819 X |
| 4,161,033 | 7/1979 | Martinson | 364/728 |
| 4,267,580 | 5/1981 | Bond | 364/824 |

Primary Examiner—David H. Malzahn

Attorney, Agent, or Firm—Robert F. Beers; Ervin F. Johnston; John Stan

[57] ABSTRACT

An array convolver and/or correlator comprises first and second two-dimensional shift registers defined by N rows and M columns, corresponding columns, the first, the second, etc., of the two registers being aligned. N and M are generally in the range of 4 to 512. Data is capable of entering at least one of the left or right columns of each of the two shift registers. The data shifts downward to the bottom row in the first, upper, shift register and upward to the top row in the second, lower, shift register.

A plurality of M analog multipliers each has an input from corresponding, aligned columns of each of the two registers. An analog summer has M inputs, one from each of the multipliers. The output of the summer is a correlation or convolution, depending upon which specific columns the data enters.

12 Claims, 13 Drawing Figures

ARRAY CONVOLVER-CORRELATOR USING AND GATES

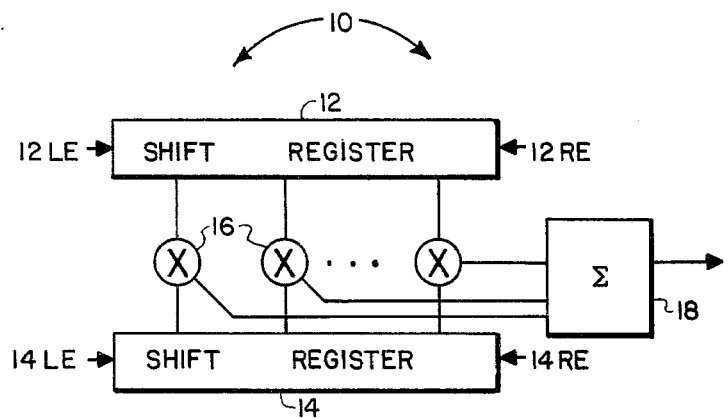
*FIG. 1* (PRIOR ART) ONE-DIMENSIONAL CONVOLVER
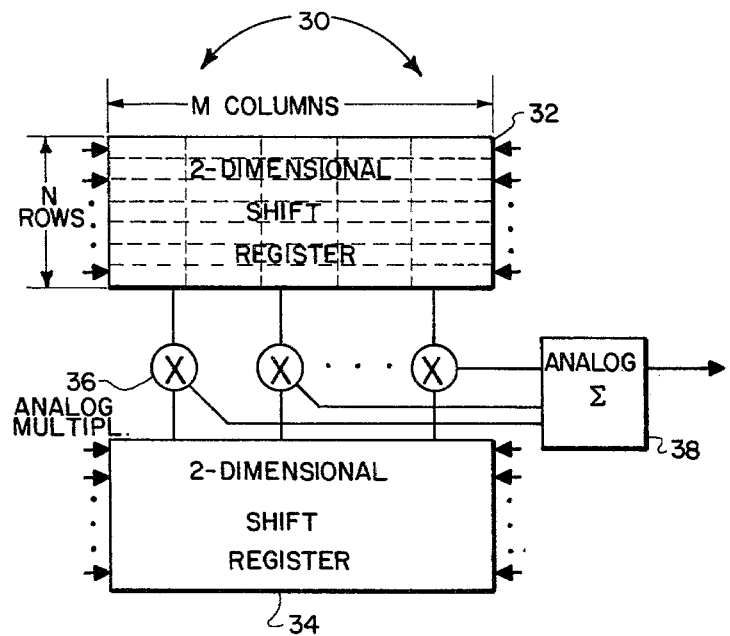
*FIG. 2* ARRAY CONVOLVER-CORRELATOR

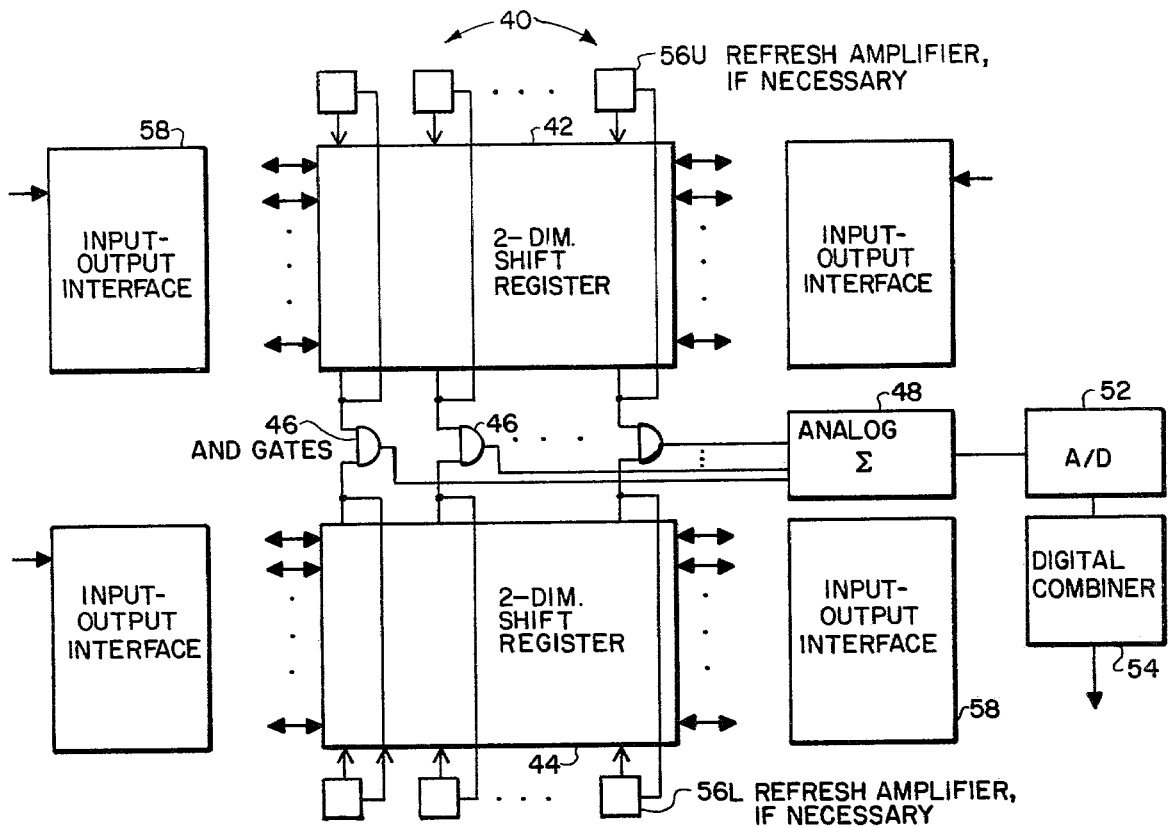
FIG. 3 ARRAY CONVOLVER-CORRELATOR USING AND GATES
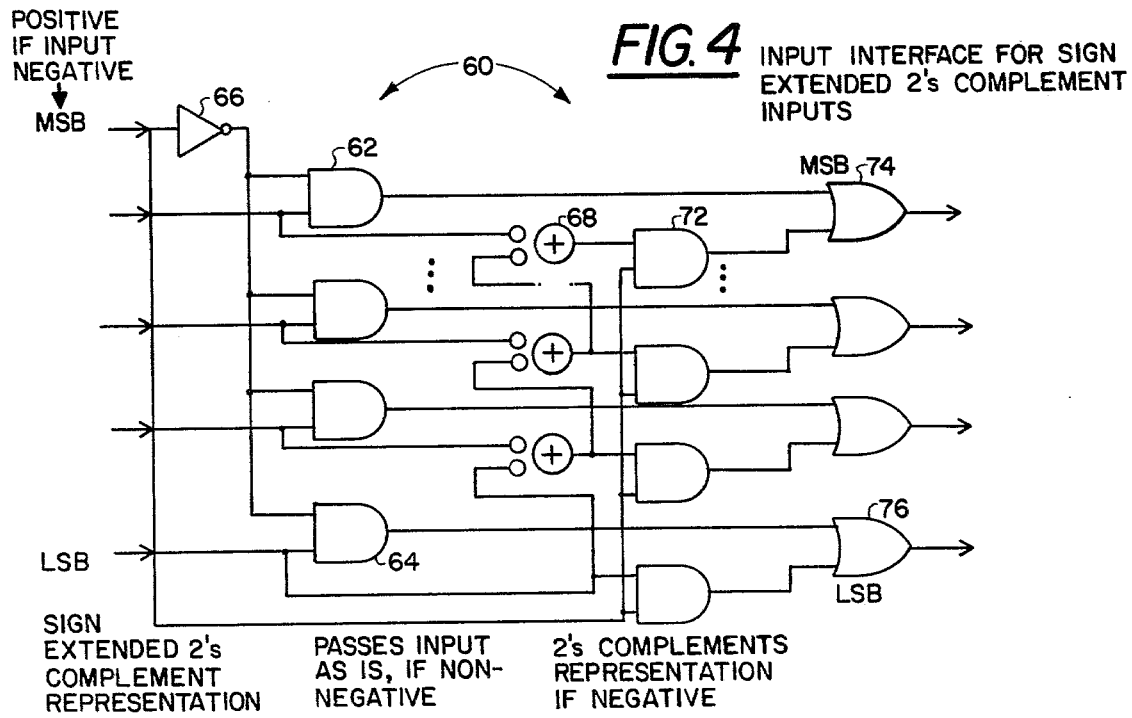
FIG. 4 INPUT INTERFACE FOR SIGN EXTENDED 2's COMPLEMENT INPUTS

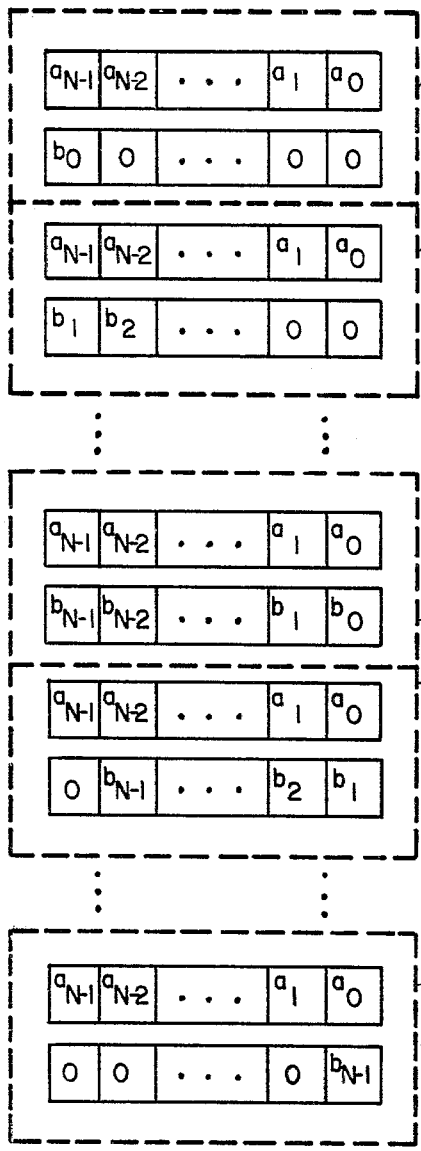
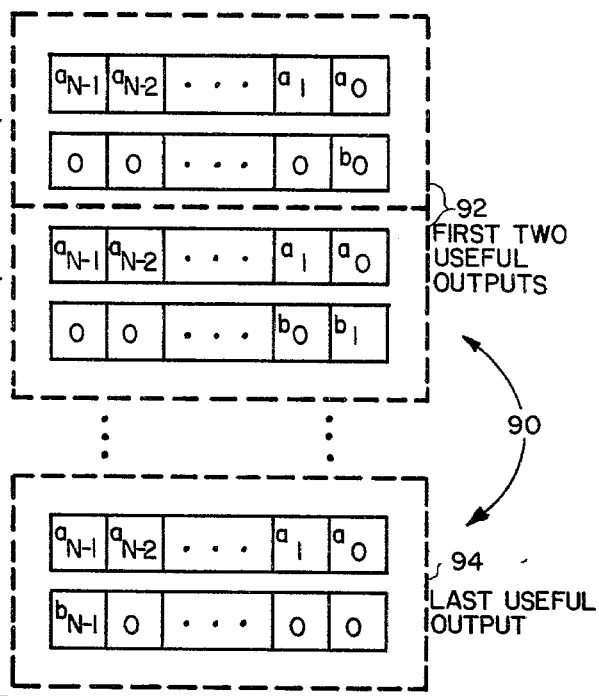
FIG. 5 COLUMN ORGANIZATION FOR CORELATION
FIG. 6 COLUMN ORGANIZATION FOR CONVOLUTION
FIG. 7 BIT ORGANIZATION WITHIN COLUMN(S) FOR SHIFT REGISTER
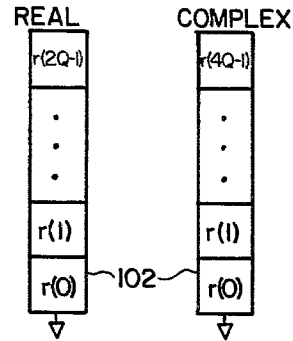
FIG. 7A 1 COLUMN FOR EACH AND GATE
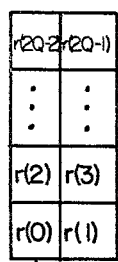 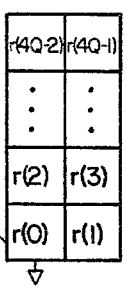
FIG. 7B 2 COLUMNS FOR EACH AND GATE
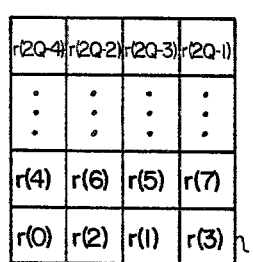
FIG. 7C 4 COLUMNS FOR EACH AND GATE

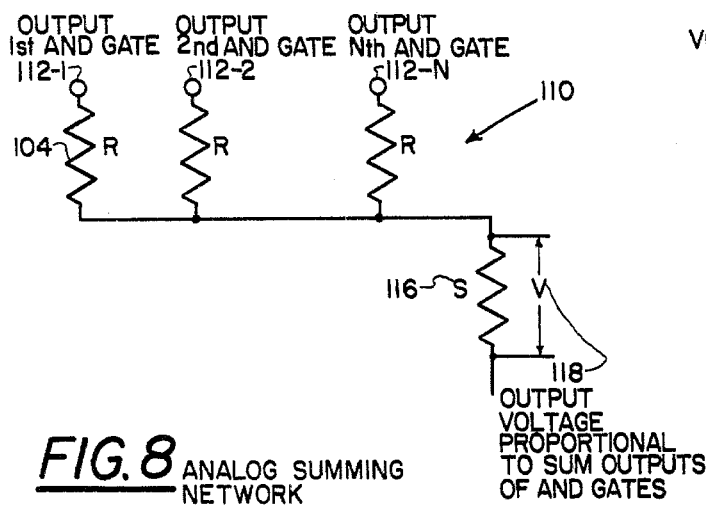
FIG. 8 ANALOG SUMMING NETWORK
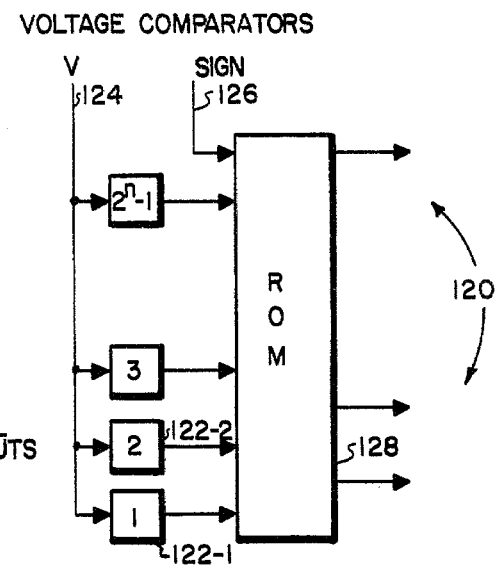
FIG. 9 A/D CONVERSION BLOCK DIAGRAM
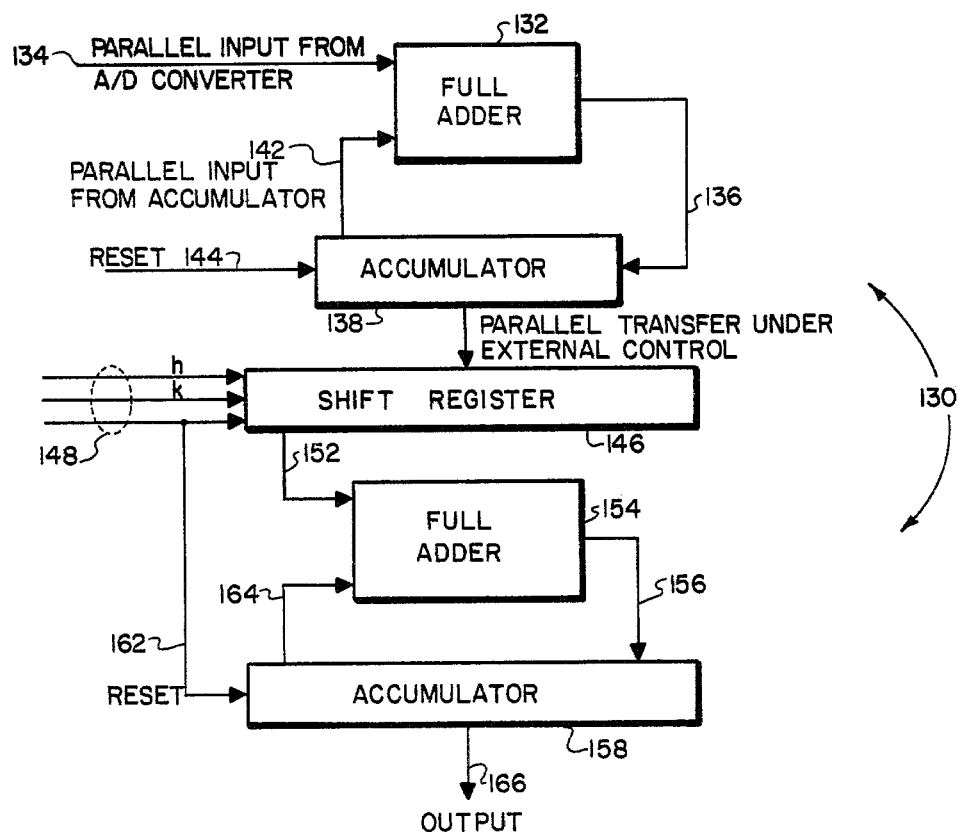
FIG. 10 BLOCK DIAGRAM FOR COMBINER

ARRAY CONVOLVER/CORRELATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many signal processing tasks require the calculation of sums of the form $$\sum_{i=0}^{N-1} a_i b_{i+k} \text{ (correlation)}$$

or $$\sum_{i=0}^{N-1} a_i b_{k-i} \text{ (convolution)}$$

for integers $k=0,1,\ldots,N-1$ for sequences of real or complex numbers $a_0, a_1, \ldots, a_{N-1}$ and $b_0, b_1, \ldots, b_{N-1}$.

The prior art convolver, or correlator, has the structure 10 shown in FIG. 1. The structure 10 consists of two one-dimensional shift registers, 12 and 14. Data can be input into either end, 12LE or 12RE of register 12 or 14LE or 14RE or register 14, or both ends of the shift registers depending on the design. The multiplier 16 can be either analog or digital. The summer 18 can be analog or digital also. The convolver or correlator 10 shown in FIG. 1 has been implemented using charge-coupled devices (CCD's), surface acoustic wave (SAW) devices, and the common digital technologies.

The invention described herein consists two two-dimensional shift registers instead of the two one-dimensional shift registers, 12 and 14, shown in FIG. 1. The invention allows more high-accuracy multiplications and sums to be performed simultaneously on a single chip than is possible using one-dimensional shift registers.

SUMMARY OF THE INVENTION

An array convolver and/or correlator comprises first and second two-dimensional shift registers defined by N rows and M columns, the columns of the two registers being aligned. N and M are generally in the range of 4 to 512. Data enters and, if interfacing is present, exits at least one of the left or right columns of each of the two shift registers. The data shifts downward to the bottom row in the first, upper, shift register and upward to the top row in the second, lower, shift register.

A plurality of M multipliers comprising M gating means, each have an input from the bottom row of the upper shift register and the top row of the lower shift register of corresponding columns of the two shift registers. A summer, having M inputs connected to the M gating means, sums the input signals in an analog manner. An analog-to-digital converter, whose input is connected to the output of the summer, converts the analog input signal into a digital signal. A combiner, whose input is connected to the output of the A-to-D converter, accumulates shifted outputs of the converter by addition and/or subtraction.

OBJECTS OF THE INVENTION

An object of the invention is to provide a convolver and/or correlator which combines two-dimensional shift registers and AND gates which can perform a large number of multiplications and additions on a single chip.

Another object of the invention is to provide such a device which can be combined in a modular manner to provide multiples of the length of the correlation and/or convolution provided by a single device.

Yet another object of the invention is to provide such a device which can be operated at different speeds.

Still another object of the invention is to provide such a device which can be used to correlate or convolve either real or complex sequences of numbers.

These and other objects of the invention will become more readily apparent from the ensuing specification when taken together with the drawings.

BRIEF DESCRIPTION OF THE DRAWINGS

FIG. 1 is a block diagram of a basic prior art one-dimensional convolver and/or correlator.

FIG. 2 is a block diagram of a basic array convolver and/or correlator.

FIG. 3 is a block diagram of an array convolver and/or correlator using AND gates.

FIG. 4 is a block diagram showing the input interface for sign extended 2's complement inputs.

FIG. 5 is a schematic diagram showing the columnar organization of the shift registers for correlation.

FIG. 6 is a schematic diagram showing the columnar organization of the shift registers for convolution.

FIG. 7, consisting of three parts, FIGS. 7A–7C, is a schematic diagram showing the bit organization within column(s) for the two-dimensional shift registers.

FIG. 8 is a schematic diagram showing one form of an analog summing network used in the invention.

FIG. 9 is a block diagram showing one form of the analog-to-digital converters.

FIG. 10 is a block diagram showing one form of the combiner used in the invention.

DESCRIPTION OF THE PREFERRED EMBODIMENTS

The prior art convolver, or correlator, has the structure 10 shown in FIG. 1. It is described in detail in the "Background of the Invention".

Referring now to FIG. 2, therein is shown an array convolver and/or correlator 30 comprising first and second two-dimensional shift registers, 32 and 34, defined by N rows and M columns. In FIG. 2, five columns and seven rows are shown. Typically, the number M of columns would range from 16 to 512 whereas the number of rows N would be from 4 to 512.

The rows shift downward with data being input to a column on either or both sides. The columns can be shifted to the left or to the right. FIG. 2 shows data inputs for every row of each of the two two-dimensional shift registers, 32 and 34, at either end. If the device 30 is to be used as both a correlator and as a convolver, then one two-dimensional shift register, 32 or 34, must be able to shift columns in the same direction as the other two-dimensional shift register, 34 or 32, and also in the opposite direction. This requires inputs on both ends of one register, 32 or 34. If the device 30 is to be used only for convolution, then inputs will only be required on one end of one two-dimensional array, 32 or 34, and on the other end of the other two-dimensional array, 34 or 32. If the device 30 is to be used only for correlation, then one input is only required on one and the same side of each of the two-dimensional shift registers, 32 and 34.

Data is capable of entering at least one of the left or right columns of each of the two shift registers, 32 and 34.

Typically, the data fills a shift register, say shift register 32, as follows. Let it be assumed that the left column of shift register 32 is filled with data first. At the next clock pulse, the column of data is moved to the column to its right and the left column is filled with new data. Both columns of data now move one column to the right, and the leftmost column is filled with data. This sequence of operation is followed until all columns are filled with data.

After all columns of shift register 32 are filled with data, the rows of data move downward, the top row of data being replaced by zeroes, then the next row of data is replaced by zeroes, etc.

A similar sequence of operations with respect to data movement occurs in shift register 34. This time, however, after all data cells are filled, the data moves in an upward direction, the bottom row now being replaced with zeroes, then the next to the bottom row, etc.

Summarizing the data movement, after both shift registers, 32 and 34, are filled with data, the data shifts downward to the bottom row in the first, upper, shift register and upward to the top row in the second, lower, shift register.

Each of a plurality of M analog multipliers 36 has an input from corresponding columns of each of the two registers, 32 and 34.

In the general case, the number of columns M is a multiple of the number P of multipliers with the same number of columns associated with each multiplier. Three different designs appear the most useful:

$$M = P \quad (1)$$

$$M = 2P \quad (2)$$

$$M = 4P \quad (3)$$

When $M=P$, there would be from 1 to P inputs, when $M=2P$ there would be from 1 to 2P inputs, etc. The parameters represented by Eqs. (2) and (3) are particularly appealing if the multipliers are single-quadrant. In such cases the different columns can be used to represent positive and negative numbers.

Electronic equivalents of N numbers based R are simultaneously input filling a complete column of one of each of the two-dimensional registers, 32 and 34. R, typically, would have a value $2 \leq R \leq 10$.

After both two-dimensional registers, 32 and 34, are filled, the electronic equivalents of the same digit of every input stored in the middle rows provide the inputs to the multipliers 36. The multipliers 36 must be able to accept inputs of R different levels and be capable of producing $(R-1)^2+1$ possible levels. The outputs of the analog multipliers 36 comprise the inputs to an analog summer 38.

Reference is now directed to FIG. 3. The description which follows is based on representation in binary of the numbers to be convolved or correlated. The operation of the array convolver/correlator 30 shown in FIG. 2 would follow from the binary case in representing the numbers in radix where R bits can be stored in every register location.

The embodiment 40 shown in FIG. 3 is a more detailed implementation than that shown in FIG. 2. The array convolver/correlator 40 comprises AND gates 46 for one-bit multipliers and two-dimensional shift registers, 42 and 44, which store one bit of information in each location of the registers. While AND gates 46 are shown in FIG. 3, other logic functions which perform an ANDing function may be used.

An analog means for summing 48, having M inputs connected to the M means for multiplying 46, sums the input signals in an analog manner.

Means 52, whose input is connected to the output of the summing means 48, converts its analog input signal into a digital signal.

The bits stored in the innermost rows of each of the two-dimensional shift registers, 42 and 44, adjacent to the AND gates 46 are combined by the AND gates. In the embodiment 40 shown in FIG. 3, one analog summer 48 and one analog-to-digtal converter 52 are used. The number of AND gates is determined by the A/D converter 52 utilized. If the converter 52 has n bits then $P \leq 2^n - 1$, where P equals the number of multipliers. Reasonable values for n range from 4 to 14. To overcome this limitation, 2, 3, or 4 parallel analog summing networks 48 could be used each combining the outputs of $\frac{1}{2}$, $\frac{1}{3}$ or $\frac{1}{4}$, respectively, of the AND gates on the same chip.

A means for combining 54, whose input is connected to the output of the A-to-D converting means 52, accumulates shifted outputs of the A-to-D converting means by addition and/or subtraction.

The digital combiner 54 provides the capability to accumulate shifted outputs of the A/D converter 52 by addition or subtraction under external control. The digital combiner 54 is described hereinbelow in additional detail, and illustrated in FIG. 10, after the inputs to the device 40 have been described as well as the nature of the multiplier 46 outputs.

A plurality of 2M means, one for each column of each of the two shift registers, 42 and 44, renews the amplitude of the signal data propagating down each path, when required. Each means, 56U and 56L, has an input connected at the data discharge end of one of the columns and has an output connected to the input of the same column. The refresh circuits 56U and 56L provide a capability for cyclically permuting the data stored in each column of the two-dimensional shift registers, 42 and 44, and for restoring to valid binary levels the quantities used to store the bits in the shift register if this is necessary. For a charge-coupled device (CCD) implementation of the array convolver/correlator 40 refresh amplifiers 56U and 56L are generally required.

The basic principle of operation is that each column of the upper two-dimensional shift register 42 can store the bit representation of an $a_i$ which can be either a real or complex number and each column of the lower two-dimensional shift register 44 can be the bit representation of a $b_j$ either a real or complex number. The multipliers 46 and the analog summer 48 can be used to generate partial sums which can be shifted and added to obtain correlation or convolution sums. The exact way in which this is accomplished depends on the representation of the input data.

A common digital arithmetic is sign extended 2's complement for the arithmetical operations to be described.

Sign-extended 2's complement means that an $N'$-bit 2's complement number is written as an N-bit binary number, $N > N'$, with the lowest $N'$-bits of the N-bit representation the same as for the N'-bit 2's complement number and the highest N-N' bits of the N-bit number equal to the highest order bit (i.e. the sign bit) of the N'-bit 2's complement number.

The relationship of the input-output interfaces 58 with inputs represented in extended 2's complement notation will first be discussed. The invention is based on representing real numbers as the difference of two non-negative real numbers.

The embodiment 60 shown in FIG. 4 illustrates the input interface for electronic equivalents of real numbers. If there are N rows in the two-dimensional shift register (42 and 44 of FIG. 3) then each of the four columns of logic gates, AND gates 62 and exclusive-or gates 68, shown in FIG. 4 contain N gates. The outputs from the first column of AND gates is the same as the inputs when a non-negative number is at the input, represented in extended 2's complements, and the outputs of the third column are all logic zeros, so that the non-negative numbers pass unchanged. If a negative number is at the input, the most significant bit is one, the outputs of the first column of AND gates are all logic zeros, the second column of exclusive-or logic elements determine the magnitude of the 2's complement number which appears on the output. The most significant bit is outputed to determine where the bits are to be input later.

If the input to the two-dimensional shift register is a Q-bit non-negative number r then the output $r^+$ may be written:

$$r^+ = \sum_{k=0}^{Q-1} r(2k)2^k, \ r(2k) = 0 \text{ or } 1, \quad (4)$$

and if the input is a negative number the output $r^-$ will be written $$r^- = \sum_{k=0}^{Q-1} r(2K+1)2^k, \ r(2k+1) = 0 \text{ or } 1 \quad (5)$$

In general, then, $$r = r^+ - r^- \text{ with } r^+ = 0 \text{ or } r^- = 0. \quad (6)$$

The one or more columns associated to a single AND gate will contain the 2Q bits $r(0), \ldots, r(2Q-1)$. The description of how the device works depends on the number of columns associated to each AND gate. If the inputs are complex then each of the real and imaginary parts will be represented by Q bits so that 4Q bits will be stored in the columns associated to each AND gate.

The organization of the information to successively obtain correlation sums for real or complex numbers is shown by the blocks 80 in FIG. 5. All information other than that necessary to understand this organization has been suppressed from this figure. The column organization is the same as the usual organization of the numbers in a shift register for an ordinary correlation or convolution. The data stored in the columns indicated by adjacent blocks, for example blocks 82 and 84, in FIG. 5 can be combined by AND gates.

FIG. 6 is a set of blocks 90 showing the column organization for convolution.

The bit organization within the columns associated with a single AND gate does not depend on whether correlation or convolution is to be performed but only upon the number of distinct columns associated with each AND gate.

Notation for the bits representing a real number have already been introduced hereinabove. For a complex number let $$d^+ = \sum_{k=0}^{Q-1} r(4k)2^k \text{ for the non-negative real part,} \quad (7)$$

$$d^- = \sum_{k=0}^{Q-1} r(4k+1)2^k \text{ for the magnitude of a negative real part,} \quad (8)$$

$$e^+ = \sum_{k=0}^{Q-1} 4(4k+2)2^k \text{ for the non-negative imaginary part,} \quad (9)$$

$$e^- = \sum_{k=0}^{Q-1} r(4k+3)2^k \text{ for the magnitude of negative} \quad (10)$$

imaginary part, so that the complex number C is represented as $$C = (d^+ - d^-) + i(e^+ - e^-), \text{ with } d^+ = 0 \text{ or } d^- = 0 \quad (11)$$

and $e^+ = 0$ or $e^- = 0$.

FIG. 7 is a set of blocks 100, having the appearance of matrices, for the different designs of the two-dimensional shift registers relative to the AND gates. The column(s) in one of two-dimensional shift registers associated with an AND gate are shown. In each case, one possible assignment of bits to the columns is shown. Except for the real case when four columns are available Q is arbitrary. In this one case, as is shown in FIG. 7C, Q must be even. The arrows in FIG. 7 denote the storage cells providing an input to the AND gate.

It is now useful to continue the description of the operation of the array convolver/correlator 40 shown in FIG. 3. The AND gates 46 combine the output of the storage cells, 102, 104, and 106, shown in FIG. 7. Referring back to FIG. 3, the output of the analog summer 48 of the array convolver/correlator 40 after each row or column shift is a partial sum of the form $$S(k, h) = \sum_{j=0}^{N-1} a_j(k)b_{j+m}(h), \ k, h = 1, \ldots, P \quad (12)$$

or of the form $$S(k, h) = \sum_{j=0}^{N-1} a_j(k)b_{m-j}(h), \ k, h = 1, \ldots, P \quad (13)$$

depending on whether convolutions or correlations, respectively, are being calculated. Each row shift provides a partial sum for a new value k and h, and each column shift a sum for a different value of m, except for the real case when four columns are associated with each AND gate 46. In this instance column shifts provide some of the partial sums for some of the h and k values.

The analog summer 48 may be implemented, as is shown in FIG. 8, by a simple resistor network 110.

The A-to-D converter 52 shown in FIG. 3 could be implemented by using a bank of comparator outputs as the addresses to a read-only memory programmed to output the desired binary coded output of the convolver/correlator 40. Since all outputs of this A-to-D converter represent non-negative numbers, a direct 2's complement coding could be accomplished by external control, providing an additional bit address which, when 1 assigns a negative sign to the analog adder 48 output and when it is a 0 assigns a positive sign.

The block diagram for this circuit 120 is shown in FIG. 9. The comparators 122 are labeled by the numerical equivalent of the voltage that the input voltage is being compared to. FIG. 9 applies to an n-bit A-to-D converter 120 where the number of AND gates 46 in FIG. 3 is $2^n-1$. The outputs of the comparators 120 along with external input denote sign provide an address to a read-only memory location storing the extended 2's complement binary representation of the sum. The default of the sign input is 0, so that in the absence of a sign input the output is the ordinary binary representation of the numerical equivalent of the input voltage. The comparator 120 could be included on the chip or off the chip, and if included on the chip the read-only memory or its logic gate equivalent could be included on or off the chip.

An output of the A-to-D converter circuit is the extended 2's complement representation of a partial sum for some value of h and k of the form $$C_m^{(\pm,\pm)}(h, k) = \sum_{j=0}^{N-1} a_j^{\pm}(h)b_{j+m}^{\pm}(k) \quad (14)$$

in the case of correlation, or of the form $$D_m^{(\pm,\pm)}(h, k) = \sum_{j=0}^{N-1} a_j^{\pm}(h)b_{j+m}^{\pm}(k) \quad (15)$$

in the case of convolution. The digital combiner must calculate $$C_m(h,k) = C_m^{(+,+)}(h,k) + C_m^{(-,-)}(h,k) - (C_m^{(+,-)}(h,k) + C_m^{(-,+)}(h,k)), \quad (16)$$

or a similarly defined $D_m(h,k)$ after four successive related partial sums have been calculated.

The next circuit to be considered is an implementation of Eqs. (17) and (18), as shown in the embodiment 130 in FIG. 10.

$$C_m = \sum_{h=0}^{N-1} \sum_{k=0}^{N-1} C_m(h, k)2^{h+k} = \text{a correlation team} \quad (17)$$

or $$D_m = \sum_{h=0}^{N-1} \sum_{k=0}^{N-1} D_m(h, k)2^{h+k} = \text{a convolution team} \quad (18)$$

These sums are formed by shifting and adding. The shifting is under external control by the inputs 148 labeled h and k. The shift registers can also be reset externally. After all Row 1 column shifts associated with a single correlation sum $C_m$ or convolution sum $D_m$ are completed, the output of the accumulator 158 shown in the bottom of FIG. 10 is $C_m$ or $D_m$. The whole combiner 130 could be fabricated using available digital components. The binary representations of all intermediate sums would be an extended 2's complement as well as the output. An alternative design would be to incorporate the logic and control required for the combiner 130 with the array convolver, analog summer, and A-to-D converter on a single large-scale integrated (LSI) chip.

Two-dimensional CCD shift register and a CCD implementation of an AND gate are described by Carlo H. Sequin and Michael F. Tompsett, in Vol. 8, *Advances In Electronics And Electron Physics*, 1975. In this reference, the structures described on pages 262-3, and shown on pages 264-5, describe how to fabricate the two-dimensional shift registers. The fabrication of an AND gate is described on page 270 and illustrated in FIG. 8.7a.

An extremely attractive implementation would utilize peristaltic charge-coupled device(PDDC) technology to implement the designs described in the Sequin and Tompsett reference.

Summarizing, the advantages of the invention over previous designs is the effective combination of two-dimensional shift registers and AND gates to provide correlators or convolvers which can perform a large number of multiplications and additions on a single chip. The device can be modularly combined to provide multiples of the correlation's or convolution's length provided by a single device. The same device can be operated at different speeds and can be used to correlate or convolve either real or complex sequences of numbers.

As alternative constructions, the input interfaces could be changed to code other than extended 2's complement binary inputs to the device. One's complement and single binary inputs could be coded into the form $r^+$, $r^-$ used by the device.

The analog summer could utilize other means than a register network. The summation shown in the A-to-D conversion to obtain the 2's complement form of the output could use carry look-ahead procedures to speed up the conversion process.

Obviously, many modifications and variations of the present invention are possible in the light of the above teachings, and, it is therefore understood that within the scope of the disclosed inventive concept, the invention may be practiced otherwise than as specifically described.

What is claimed is:
1. An array convolver-correlator comprising:
   first and second two-dimensional shift registers defined by N rows and M columns, the columns of the two registers being aligned, N and M being in the range of 4 to 512, data capable of entering at least one of the left or right columns of each of the two shift registers, the data shifting downward to the bottom row in the first, upper, shift register and upward to the top row in the second, lower, shift register;
   a plurality of M means for multiplying, comprising M gating means, each having an input from the bottom row of the upper shift register and the top row of the lower shift register of corresponding columns of the two shift registers;
   means for summing, having M inputs connected to the M gating means, for summing the input signals in an analog manner;
   means, whose input is connected to the output of the summing means, for converting the analog input signal into a digital signal; and
   a means for combining, whose input is connected to the output of the A-to-D converting means, for accumulating shifted outputs of the A-to-D converting means by addition and subtraction.
2. An array convolver-correlator according to claim 1, further comprising:
   a plurality of 2 M means, one for each column of each of the two shift registers, each means having an input connected at the end of one of the columns and having an output connected to the input of the same column, for renewing the amplitude of the signal data propagating down each column.

3. The convolver-correlator according to claim 2, further comprising:
   a plurality of means for interfacing, each having inputs and outputs connected to the data entry and exit columns, for interfacing with the shift registers.

4. The convolver-correlator according to claim 2, wherein:
   the shift registers, the means for multiplying and the means for summing are implemented as charge-coupled devices (CCDs).

5. The convolver-correlator according to claim 1, wherein:
   one of the shift registers is capable of entering data from either side; and
   the other shift register being capable of entering data from one side only;
   the convolver-correlator being capable of performing both a correlation and a convolution.

6. The convolver-correlator according to claim 1, wherein:
   one of the shift registers is capable of entering data from one side only; and
   the other shift register being capable of entering data from the same side only;
   the combination thereby being capable of performing a correlation only, and hence is a correlator.

7. The convolver-correlator according to claim 6 further comprising:
   a plurality of means for interfacing, each having inputs and outputs connected to the data entry and exit columns, for interfacing with the shift registers.

8. The convolver-correlator according to claim 1, wherein:
   one of the shift registers is capable of entering data from one side only; and
   the other shift register being capable of entering data from the opposite side only;
   the combination thereby being capable of a convolution only, and hence is a convolver.

9. The convolver-correlator according to claim 8, further comprising:
   a plurality of means for interfacing, each having inputs and outputs connected to the data entry and exit columns, for interfacing with the shift registers.

10. The convolver-correlator according to claim 1, further comprising:
    a plurality of means for interfacing, each having inputs and outputs connected to the data entry and exit columns of the shift registers, for interfacing with the shift registers.

11. The convolver-correlator according to claim 1, wherein the analog means for summing comprises a resistance network comprising:
    a plurality of M parallel resistors, one end of each connected to the output of a corresponding gating means, the other ends of each connected to a common junction; and
    a summing resistor, having one end connected to the common junction, the other end being connected to the A-to-D converting means.

12. An array convolver-correlator comprising:
    first and second two-dimensional shift registers defined by N rows and M columns, the columns of the two registers being aligned, N and M being in the range of 4 to 512, data capable of entering at least one of the left or right columns of each of the two shift registers, the data shifting downward to the bottom row in the first, upper, shift register and upward to the top row in the second, lower, shift register;
    a plurality of M means for multiplying, comprising M gating means, each having an input from the bottom row of the upper shift register and the top row of the lower shift register of corresponding columns of the two shift registers;
    means for summing, having M inputs connected to the M gating means, for summing the input signals in an analog manner;
    means, whose input is connected to the output of the summing means, for converting the analog input signal into a digital signal; and
    a means for combining, whose input is connected to the output of the A-to-D converting means, for accumulating shifted outputs of the A-to-D converting means by addition and subtraction.

* * * * *